Patented Nov. 21, 1922.

1,436,047

UNITED STATES PATENT OFFICE.

CHARLES MOUREU, OF PARIS, FRANCE.

PROCESS FOR THE STABILIZATION OF ACROLEIN AND THE RESULTING PRODUCT.

No Drawing. Application filed December 28, 1920. Serial No. 433,663.

*To all whom it may concern:*

Be it known that I, CHARLES MOUREU, citizen of the Republic of France, residing in Paris, 1 place Marcellin-Berthelot, in the Republic of France, have invented certain new and useful Processes for the Stabilization of Acrolein and the Resulting Product, of which the following is an exact and complete specification.

This invention relates to a process for the manufacture of acrolein. It is known that acrolein can be obtained by dehydration of glycerine according to the reaction:

In order to avoid the decomposition of acrolein, it is possible to utilize the stabilizing properties of certain bodies which, added to the acrolein will stabilize it even if change has already commenced in it. This addition can be made, evidently, either after the preparation of the acrolein, or in the course of its preparation, by means of a secondary reaction, independent or otherwise of the preparation itself. The phenol compounds thus added to the acrolein during the course of manufacture will naturally be held in combination during the succeeding operations, except when distillation methods of production are employed. These bodies must be employed in very small proportions so that normally they will in no way prove inconvenient for the direct utilization of the acrolein which has thus been stabilized.

According to the present invention, it has been found that such stabilizing properties are possessed by phenols such as monophenol or polyphenols which when added to acrolein stabilize it even if the transformation has already begun.

Thus, 1 part per thousand (0.1%) of pyrogallol; 1 part in 500 (0.2%) of pyrocatechol or hydroquinone; 1 part per 250 (0.4%) of gallic acid or 1 part per 100 (1%) of tannin dissolved in ether may be employed.

Various natural and artificial products containing phenols possess the same properties, for instance tanning extracts, etc.

This stabilization may last for several years, especially by avoiding the action of sunlight and by avoiding temperatures above 30° C.

Smaller proportions of these stabilizing agents may be employed if it is only desired to stabilize the product for a short time.

In any case the presence of these reagents considerably slows down the influence of heat and light which always accelerate the formation of diacryl.

Having now particularly described and ascertained the nature or my said invention and in what manner the same is to be performed, I declare that what I claim is:

1. A process for the stabilization of acrolein to prevent its transformation into diacryl which consists in adding a phenol thereto in amount depending upon the desired duration of stability of the acrolein.

2. Acrolein stabilized by the addition of a phenol.

In witness whereof, I have hereunto signed my name.

CHARLES MOUREU.